(12) United States Patent
Yoakim et al.

(10) Patent No.: US 8,304,006 B2
(45) Date of Patent: Nov. 6, 2012

(54) CAPSULE WITH OUTER SEALING MATERIAL PRESSURIZED BY FLUID AND METHOD AND SYSTEM FOR USING SAME

(75) Inventors: Alfred Yoakim, St-Legier-La Chiesaz (CH); Gilles Gavillet, Ursy (CH); Jean-Paul Denisart, La Conversion (CH); Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 748 days.

(21) Appl. No.: 12/281,440

(22) PCT Filed: Mar. 20, 2007

(86) PCT No.: PCT/EP2007/052613
§ 371 (c)(1),
(2), (4) Date: Sep. 2, 2008

(87) PCT Pub. No.: WO2007/113100
PCT Pub. Date: Oct. 11, 2007

(65) Prior Publication Data
US 2009/0017177 A1    Jan. 15, 2009

(30) Foreign Application Priority Data

Mar. 31, 2006   (EP) ..................................... 06006922

(51) Int. Cl.
*A23L 2/395* (2006.01)
(52) U.S. Cl. .......... 426/431; 426/433; 426/112; 426/77; 426/84; 99/295; 99/302 R
(58) Field of Classification Search .................. 426/431, 426/433, 112, 77, 84; 99/295, 302 R
See application file for complete search history.

(56) References Cited

U.S. PATENT DOCUMENTS 2,451,195 A * 10/1948 Brown ............................ 99/295
(Continued)

FOREIGN PATENT DOCUMENTS

AU          51 220/73         7/1974
(Continued)

OTHER PUBLICATIONS

International Search Report and written Opinion PCT/EP2007/052613.

(Continued)

*Primary Examiner* — Anthony Weier
(74) *Attorney, Agent, or Firm* — Winston & Strawn LLP

(57) ABSTRACT

A method for producing a beverage from an ingredient-containing capsule by inserting a sealed capsule into a capsule enclosure space of a beverage production device, enclosing the capsule by a relative displacement of at least two enclosing members which define the capsule enclosure space, and opening an inlet face of the capsule and injecting a fluid under pressure into the capsule in order to open an outlet face of the capsule. The capsule is provided at its outer surface with sealing material which is exposed to the fluid pressure in the capsule enclosure space. After enclosing the capsule, the fluid pressure in the capsule at least partially acts on the sealing material, such that in turn the sealing material is pressed against one of the enclosing members thus constituting a flow resistance that is sufficient to guarantee a pressure build-up inside the capsule sufficient for the pressure-assisted opening of the outlet face of the capsule.

23 Claims, 16 Drawing Sheets

U.S. PATENT DOCUMENTS

| | | | |
|---|---|---|---|
| 3,445,237 A | 5/1969 | Gidge | 99/77.1 |
| 4,136,202 A | 1/1979 | Favre | 426/77 |
| 4,254,694 A | 3/1981 | Illy | 99/295 |
| 4,429,623 A | 2/1984 | Illy | 99/295 |
| 4,471,689 A | 9/1984 | Piana | 99/295 |
| 5,008,013 A | 4/1991 | Favre et al. | 210/482 |
| 5,072,661 A | 12/1991 | Kondo | 99/296 |
| 5,108,768 A | 4/1992 | So | 426/77 |
| 5,197,374 A | 3/1993 | Fond | 99/295 |
| 5,242,702 A | 9/1993 | Fond | 426/433 |
| 5,327,815 A | 7/1994 | Fond et al. | 99/295 |
| 5,398,595 A | 3/1995 | Fond et al. | 99/295 |
| 5,402,702 A | 4/1995 | Hata | 99/295 |
| 5,402,707 A | 4/1995 | Fond et al. | 99/295 |
| 5,472,719 A | 12/1995 | Favre | 426/77 |
| 5,649,472 A | 7/1997 | Fond et al. | 99/295 |
| 5,656,316 A * | 8/1997 | Fond et al. | 426/433 |
| 5,897,899 A | 4/1999 | Fond | 426/112 |
| 6,026,732 A | 2/2000 | Kollep et al. | 99/295 |
| 6,832,542 B2 | 12/2004 | Hu et al. | 99/302 R |
| 6,854,378 B2 | 2/2005 | Jarisch et al. | 99/295 |
| 6,955,116 B2 | 10/2005 | Hale | 99/295 |
| 7,640,842 B2 | 1/2010 | Bardazzi | 99/295 |
| 7,926,415 B2 | 4/2011 | Yoakim et al. | 99/295 |
| 7,993,691 B2 | 8/2011 | Yoakim et al. | 426/77 |
| 2001/0052294 A1 | 12/2001 | Schmed | 99/295 |
| 2002/0015768 A1 | 2/2002 | Masek et al. | 426/115 |
| 2002/0121198 A1 | 9/2002 | Kollep et al. | 99/279 |
| 2003/0089245 A1 | 5/2003 | Kollep et al. | 99/495 |
| 2003/0217643 A1 | 11/2003 | Masek et al. | 99/279 |
| 2004/0191371 A1 | 9/2004 | Halliday et al. | 426/112 |
| 2004/0206245 A1 | 10/2004 | Halliday et al. | 99/337 |
| 2004/0228955 A1 | 11/2004 | Denisart | 426/590 |
| 2004/0231521 A1 | 11/2004 | Yoakim | 99/275 |
| 2005/0235834 A1 | 10/2005 | Blanc et al. | 99/279 |
| 2006/0110507 A1 | 5/2006 | Yoakim et al. | 426/112 |
| 2007/0104837 A1 | 5/2007 | Yoakim | 426/77 |
| 2007/0202237 A1 | 8/2007 | Yoakim et al. | 426/590 |
| 2007/0224319 A1 | 9/2007 | Yoakim et al. | 426/433 |
| 2009/0280219 A1 | 11/2009 | Yoakim et al. | 426/433 |

FOREIGN PATENT DOCUMENTS

| | | | |
|---|---|---|---|
| CA | 2067515 | * | 2/1999 |
| CA | 2072300 | * | 5/2003 |
| CH | 503 630 A | | 4/1971 |
| DE | 938 984 | | 2/1956 |
| DE | 14 29 932 A1 | | 3/1969 |
| DE | 35 04 441 A1 | | 8/1986 |
| EP | 0 361 569 | | 4/1990 |
| EP | 0 361 634 A1 | | 4/1990 |
| EP | 0 468 079 | | 1/1992 |
| EP | 0 468 080 | | 1/1992 |
| EP | 0 512 468 | | 11/1992 |
| EP | 0 512 470 | | 11/1992 |
| EP | 0 604 615 | | 7/1994 |
| EP | 0 710 462 | | 5/1996 |
| EP | 1 090 574 B1 | | 4/2001 |
| EP | 1 101 430 | | 5/2001 |
| EP | 1 203 544 A1 | | 5/2002 |
| EP | 1 327 407 A2 | | 7/2003 |
| EP | 1 344 724 | | 5/2006 |
| EP | 1 654 966 A1 | | 5/2006 |
| FR | 2 160634 | | 6/1873 |
| FR | 2041380 | | 1/1971 |
| FR | 2093111 | | 1/1972 |
| FR | 2213757 | | 8/1974 |
| FR | 2 617 389 | | 1/1989 |
| GB | 899055 A | | 6/1962 |
| JP | 61-289812 | | 12/1986 |
| JP | S61-280812 | | 12/1986 |
| JP | S63-032852 | | 7/1988 |
| JP | 2304277 A | | 12/1990 |
| JP | 4-236923 | | 8/1992 |
| JP | 4236921 A | | 8/1992 |
| JP | 05130944 | | 5/1993 |
| JP | 05192246 | | 8/1993 |
| JP | 05192248 | | 8/1993 |
| JP | 05199937 | | 8/1993 |
| JP | 11210600 A | | 8/1999 |
| JP | 2003500676 A | | 1/2003 |
| JP | 2003265320 A | | 9/2003 |
| JP | 2004517654 | | 6/2004 |
| JP | 2004218841 A2 | | 8/2004 |
| JP | 2004257521 | | 9/2004 |
| JP | 2004533305 | | 11/2004 |
| JP | 2005199938 A | | 7/2005 |
| JP | 2006501012 | | 1/2006 |
| RU | 2311109 | | 11/2007 |
| WO | WO 93/17932 A1 | | 9/1993 |
| WO | WO 94/02059 A1 | | 2/1994 |
| WO | WO 95/10724 | | 4/1995 |
| WO | WO 02/43541 | | 6/2002 |
| WO | WO 03/002423 A1 | | 1/2003 |
| WO | WO 03/059778 | | 7/2003 |
| WO | WO 2004/071259 | | 8/2004 |
| WO | WO 2005/004683 | | 1/2005 |
| WO | WO 2006/045537 A1 | | 5/2006 |

OTHER PUBLICATIONS

Non-Final Office Action dated Sep. 1, 2009 for U.S. Appl. No. 11/737,560.
Final Office Action dated Apr. 2, 2010 for U.S. Appl. No. 11/737,560.
Advisory Action dated Jun. 15, 2010 for U.S. Appl. No. 11/737,560.
Non-Final Office Action dated Jul. 22, 2010 for U.S. Appl. No. 11/737,560.
Restriction Requirement dated Feb. 3, 2010 for U.S. Appl. No. 11/737,334.
Non-Final Office Action dated Apr. 9, 2010 for U.S. Appl. No. 11/737,334.
Final Office Action dated Aug. 18, 2010 for U.S. Appl. No. 11/737,334.
Non-Final Office Action dated Sep. 10, 2010 for U.S. Appl. No. 11/258,433.
Advisory Action dated Jun. 4, 2010 for U.S. Appl. No. 11/258,433.
Non-Final Office Action dated Aug. 7, 2009 for U.S. Appl. No. 11/258,433.
Restriction Requirement dated Apr. 2, 2009 for U.S. Appl. No. 11/258,433.
Final Office Action dated Mar. 25, 2010 for U.S. Appl. No. 11/258,433.
Final Office Action dated Feb. 3, 2011 for U.S. Appl. No. 11/737,560.
Notice of Allowance mailed Apr. 6, 2011 for U.S. Appl. No. 11/258,433, filed Oct. 25, 2005.
Notice of Opposition to European patent No. 1 816 935 dated Oct. 7, 2009.
Notice of Opposition to European patent No. 1 700 548 dated May 8, 2008.
International Search Report and Written Opinion mailed Dec. 23, 2005, Application No. PCT/EP2005/011306 filed Oct. 20, 2005.
Advisory Action dated Apr. 13, 2010 for U.S. Appl. No. 11/734,560.
Advisory Action dated Jun. 15, 2010 for U.S. Appl. No. 11/734,560.
Notice of Allowance mailed Mar. 22, 2011 for U.S. Appl. No. 11/737,334, filed Apr. 19, 2007.

* cited by examiner

CAPSULE WITH OUTER SEALING MATERIAL PRESSURIZED BY FLUID AND METHOD AND SYSTEM FOR USING SAME

This application is a 371 filing of International Patent Application PCT/EP2007/056213 filed Mar. 20, 2007.

BACKGROUND

The present invention generally relates to capsules for containing beverage ingredients, to a beverage producing system comprising such capsules as well as to methods for producing beverages on the basis of ingredients contained in such capsules.

Note that the term "beverage" is meant to also encompass liquid comestibles in the framework of the present specification and the enclosed claims.

The background of the present invention is the field of capsules which contain beverage ingredients or other comestible (e.g. soup) ingredients. By means of an interaction of these ingredients with a liquid, a beverage or other comestibles, such as for example soups, can be produced. The interaction can be for example an extraction, brewing, dissolution, mixing etc. process. Such a capsule is e.g. adapted to contain ground coffee in order to produce a coffee beverage by having hot water under pressure enter the capsule and draining a coffee beverage from the capsule.

Systems and methods for obtaining liquid comestibles from capsules are for example known from EP-A-512470 (counterpart of U.S. Pat. No. 5,402,707), the teaching of which will be explained in the following.

The capsule 101 as shown in FIG. 1 has a frustoconically-shaped cup 102 which may be filled e.g. with roasted and ground coffee 103 and which is closed by a foil-like tear face cover 104 welded and/or crimped to a flange-like rim which extends laterally from the side-wall of cup 102. A capsule holder 111 comprises a flow grill 112 with relief surface element members 113.

The capsule holder 111 is accommodated in its support 115 which has a lateral wall 124 and a bore 127 for the passage of extracted coffee beverage.

As can be seen from FIG. 1 the extraction system further comprises a water injector 107 having a water inlet channel 120 and an annular element 108 with an internal recess of which the shape substantially corresponds to the outer shape of the capsule. On its outer part, the annular member 108 comprises a spring 122 holding a ring 123 for releasing the capsule on completion of extraction.

In operation, a capsule 101 is placed in the capsule holder 111. The water injector 107 perforates the upper face of the cup 102. The lower tear face 104 of the capsule rests on the radially arranged members 113 of the capsule holder 111.

The water is injected through the channel 120 of the water injector 107 and impinges on the bed 103 of coffee. The pressure in the capsule 101 increases and the tear face 104 increasingly follows the shape of the radial opening relief members 113. Such radial opening relief members could be replaced by pyramid-shaped reliefs or other shapes of relief. When the constituent material of the tear face reaches its breaking stress, the tear face tears along the relief members. The extracted coffee flows through the orifices of the flow grill 112 and is recovered in a container (not shown) beneath the bore 127.

The principles of this extraction process as far as they can be maintained in connection with the present invention can be summarized as follows:

An initially sealed capsule is inserted into a capsule enclosure space of the machine;

The capsule enclosure space is closed by transferring enclosing members from an opened state into a capsule-enclosing state.

In a first wall of the capsule at least one opening is generated and a liquid under pressure is injected into the capsule.

The pressure inside the capsule assists in the opening of an outlet face of the capsule.

Water entering the capsule through the opening in the first wall is interacting with the ingredients contained in the capsule while traversing the interior of the capsule and is then made to leave the capsule through the opened outlet face.

The ingredients in the capsule preferably constitute the "bottleneck" of the flow path of the water and will therefore cause a pressure drop between the upstream and the downstream side of the liquid flow through the capsule, which pressure drop can even increase during the interaction between the liquid and the ingredients for example due to a swelling of the ingredients. Correspondingly it has to be assured that the only water flow is actually taking place through the interior of the capsule (arrow A1) and that no water can flow from the water injector into the interstice between the annular enclosing member 108 and the exterior of the capsule 101 and then to the draining bore 127 of the device. The arrow A2 illustrates this undesired water flow path.

In other words, any water flow exterior to the capsule 101 has to encounter a substantial flow obstacle produced by a sealing engagement being positioned in the interstice between the annular member 108 and the capsule 101 and in the flow path between the water injector and the beverage outlet.

In case the sealing engagement is not working at all and water is flowing outside the capsule without encountering a sufficient flow resistance, the pressure necessary to cause the tearing of the outlet face will not be built up inside the capsule or, alternatively, the low pressure will result in an incomplete tearing of the outlet face and therefore a poor extraction of the substance. In such a scenario water will be drained from the beverage production device without having interacted or fully interacted with the ingredients contained in the capsule under sufficient pressure conditions.

An improvement could be thought of according to which the sealing engagement is assisted by lining the inner wall of the annular member with a rubber-elastic material. According to said approach the sealing engagement is assured by structures fixed to or attached with the beverage-producing device. This has disadvantages in that after the use of a substantial number of capsules a wearing off of the fixed sealing means can take place such that the quality of the produced beverage is increasingly deteriorated by water passing the no longer properly efficient sealing.

SUMMARY OF THE INVENTION

The present invention correspondingly aims at an improvement of the sealing engagement positioned between the liquid inlet and the beverage draining side of such a beverage production system.

The present invention, in one aspect, proposes to add sealing material to the outer surface of the capsule. The advantage is that any sealing material thus is only used once (i.e. only with the associated capsule) such that a proper functioning of the sealing can be assured and no hygienic problems can occur at the sealing member. As the sealing material is only used once, imperfect characteristics of the sealing material (inelasticity etc.) can be accepted.

A first aspect of the invention relates to a method for producing a beverage from an ingredient-containing capsule. The method comprising the following steps:

enclosing a sealed capsule into a capsule enclosure space of a beverage production device by a relative displacement of at least two enclosing members which define the capsule enclosure space, after the insertion of the capsule into the capsule enclosure space, opening an inlet face of the capsule and injecting a fluid under pressure into the capsule in order to open an outlet face of the capsule. The opening of the outlet face can be assisted by the fluid pressure inside the capsule. The capsule is provided at its outer surface with sealing material which is exposed to the fluid pressure in the capsule enclosure space.

After enclosing the capsule, having the fluid pressure reigning in the capsule enclosure space at least partially act on the sealing material, such that in turn the sealing material is pressed against one of the enclosing members thus constituting a flow resistance. The flow resistance should be sufficient to cause a pressure build-up inside the capsule sufficient for the pressure-assisted opening of the outlet face of the capsule.

The fluid pressure can act on the sealing material such that the sealing material is pressed both against the enclosure member and the outer surface of the capsule.

The fluid pressure can press the sealing material in a direction towards a region at the outer surface of the capsule in which the clearance between one of the enclosing members to the outer surface of the capsule, measured without the sealing material, is zero or smaller than the clearance at the initial location of the unpressurized sealing material.

The outlet face of the capsule can open at a pressure of more than 4 bars, preferably more than 6 bars, most preferred more than 8 bars.

The two enclosing members can at least partially pinch a portion of the sealing material and a flange-like rim of the capsule.

The displacement of the enclosure members can follow an essentially translational trajectory in its final approach phase.

At least a portion of the sealing material can be partially compressed by the enclosing members when closing the capsule enclosure space.

The sealing material can be compressed by the fluid pressure.

In one possible mode, the sealing material can be inelastic.

The inelastic sealing material can be selected from the group comprising plastics, metal, fibres, paper, powder, cotton, viscous paste and foamed or sintered material and combinations thereof.

The sealing material can be plastically deformed.

In another form, the sealing material can be resilient at least in part.

The part of resilient sealing material can be selected from the group consisting of plastics or elastomer and combinations thereof.

The sealing material can be constituted of both inelastic material and resilient material such as in layers, filler-matrix or blend or other forms. For instance, the elastic material can constitute a resilient matrix and the inelastic material can be a filler of the sealing material.

The sealing material can be attached to the outer face of the capsule by gluing, welding, press-fitting and/or crimping.

In another mode, the sealing material is an integral part of the outer face of the capsule.

The sealing material can have a thickness of 0.3 mm to 2.5 mm, preferably 0.5 mm to 2 mm.

The engaging surface of the enclosing member can be provided with corrugations which are at least substantially closed by the pressurized sealing material.

A further aspect of the present invention relates to a beverage production system. The system comprises a capsule enclosure space which can selectively enclose a capsule by a relative displacement of at least two enclosing members, a beverage-ingredient containing capsule comprising an outlet face, and a fluid injection member for injecting a fluid under pressure into the capsule, the pressure of the fluid injection assisting in the opening of the outlet face.

The capsule is provided with sealing material at its outer surface. The sealing material is geometrically arranged in order to be exposed to the fluid pressure in the capsule enclosure space. The capsule enclosing members and the capsule are geometrically arranged such that at least one of said enclosing members is engaged by the sealing member of the capsule under the effect of the fluid pressure being present between the outer surface of the capsule acting on the sealing member. The sealing material is pressed against the cooperating enclosing member to form a flow resistance which is effective to enable pressure inside the capsule sufficient to assist in the opening of the outlet face.

BRIEF DESCRIPTION OF THE DRAWINGS

Further advantages, features and objects of the present invention will become apparent for the man skilled in the art when reading the following detailed description of embodiments of the present invention taking in conjunction with the figures of the enclosed drawings.

DETAILED DESCRIPTION OF THE PREFERRED EMBODIMENTS

Figure 1:
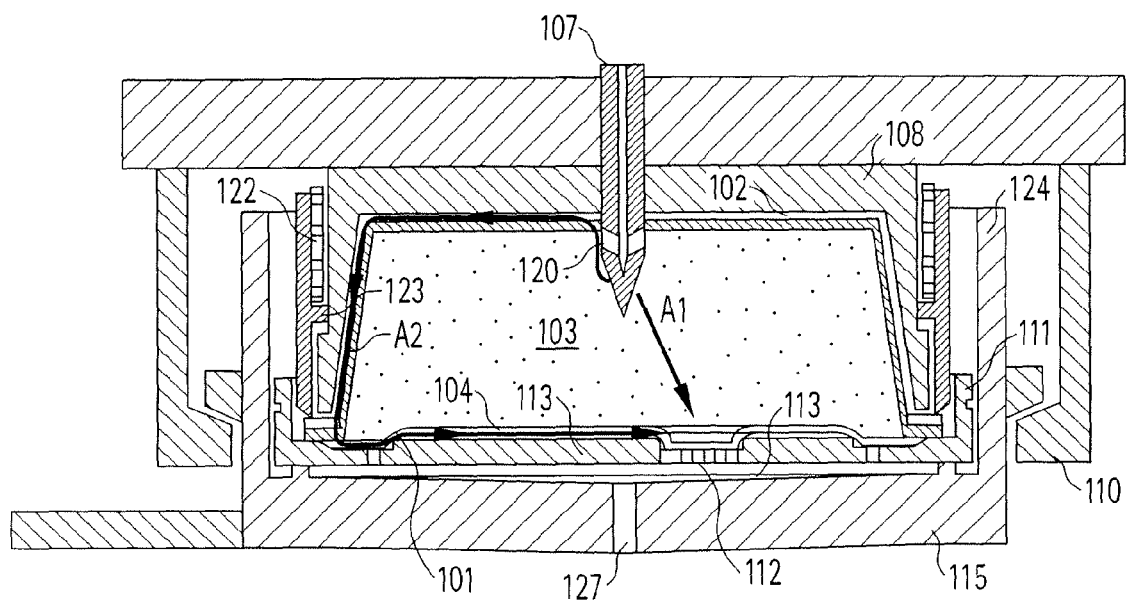
FIG. 1 shows an extraction capsule known from EP-A-512470.
Figure 2:
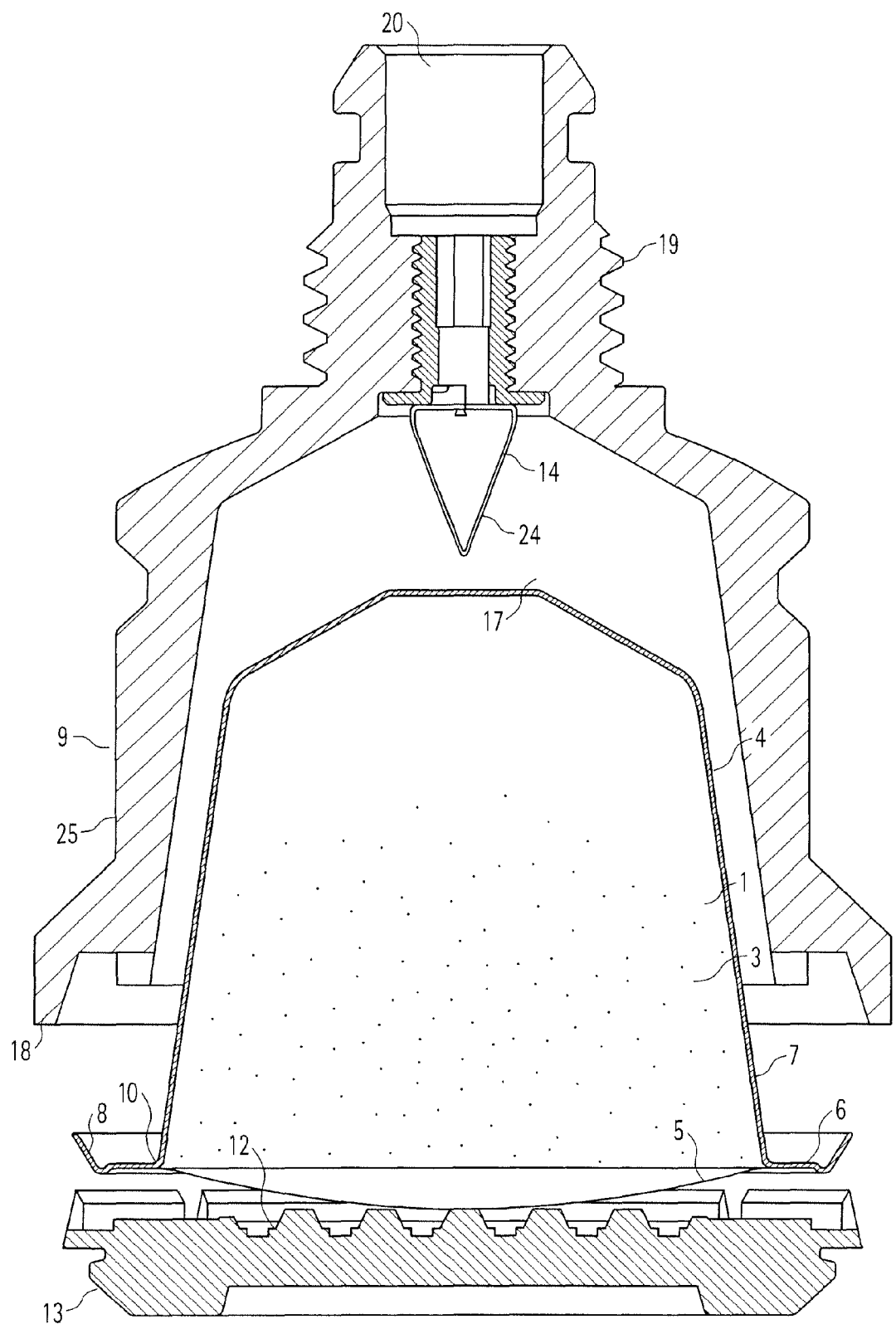
FIG. 2 shows a system in which a capsule is placed on the capsule holder but has not yet reached its closing position in the beverage production device.

With reference to FIG. 2 now a first detailed embodiment will be explained.

Note that in the following the invention will be explained referring to a certain design of a capsule, i.e. a design according to which the capsule comprises a cup-like base body and a closing foil member. However, it is to be understood than other designs of the capsule are viable, such as e.g. capsules having a lenticular form with two essentially matching and opposing walls (e.g. foils) being sealed at the e.g. ring-shaped edge. Generally a capsule according to the present invention comprises at least two opposing wall members (faces) which are connected to each other at their respective edges to form a sealed flange-like rim area, thus enclosing a sealed interior.

The embodiment shows a capsule holder 13 having relief elements 12 which are designed to tear and perforate a foil member 5 closing off a cup-like base body 4 of the capsule 1. This tearing of the foil member 5 can e.g. occur as soon as the pressure inside the capsule exceeds a threshold value. Note that the relief elements can have any protruding shape able to cause a (partial) tearing of the foil member. As an example only pyramids, needles, bumps, cylinders, elongated ribs are cited.

Within the capsule 1 ingredients 3 are contained, wherein the ingredients 3 are selected such that a beverage can be produced when having a liquid entering the capsule in the region of the top wall 17 of the capsule 1 and then interact which such ingredients 3. Preferred ingredients are e.g. ground coffee, tea or any other ingredients from which a beverage or other liquid or viscous comestible (e.g. soup) can be produced.

FIG. 2 shows a state in which such a capsule has been placed on a capsule holder 13, the foil member 5 resting on the relief element 12 side of the capsule holder 13 and the cup-like base body 4 of the capsule 1 being already partly surrounded by the circumferential wall 25 of an enclosing member 9 of the beverage production device. The shown enclosing member has the shape of a bell. Other shapes are viable, wherein the design of the interior contours (recess) of the enclosing member is generally adapted to substantially match the contours of the capsule 1.

The capsule holder 13 (also representing an enclosing member) and the enclosing member 9 thus can selectively enclose a capsule enclosure space when transferred from an opened position into a capsule-enclosing position.

Note that the foil member 5 as shown is not necessarily exactly flat due to a defined over pressure inside the capsule, which over pressure is generated by introducing e.g. a protective gas when producing the filled capsule.

The enclosing (bell) member 9 furthermore comprises an annular support skirt 18, the function of which will be explained later, an external thread 19 for mounting the bell member in a beverage production device and a water inlet opening 20 for feeding a liquid such as for example hot water under pressure to a water injector 14 which is releasable mounted (screwed) to the bell member 9.

Note that the thread 19 is just an example for connection means, be it releasable or permanent connection means.

The other components of the beverage production device, such as e.g. the mechanism for displacing the bell member and eventually also the capsule holder are known from the prior art in the field of capsule-based espresso machines.

The water injector 14 can also comprise a perforation element (blade, pin, etc.) 24 designed to produce an opening in the top wall 17 of the capsule 1 when the capsule holder 13 and the bell member 9 are moved close together e.g. by a manually operated or a automatic mechanism. A channel (not shown in the drawings) traverses the perforation element 24 such that water can be fed to the interior of the capsule 1 once the perforation element 14 protrudes into the interior of the capsule 1.

The capsule 1 comprises said top wall 17, a side wall 7 and a flange-like rim 6, wherein the foil member 5 is sealed to said flange-like rim 6 to close-off hermetically the cup-like base body 4 of the capsule 1. Again, other designs for the capsule are possible as long as the capsule can be sealed and contain the mentioned ingredients.

According to the present invention the outer surface of the capsule 1 presents a dedicated sealing member (sealing material) 8. The sealing member 8 can be resilient due to the material used and/or due to the geometrical shape of the sealing member 8.

Further on, the sealing member 8 can be integral to the capsule 1 or a separate piece. In the latter case the sealing member can be mounted releasably to the base body 4 or fixed thereto e.g. by welding or by means of an adhesive.

In case the sealing member 8 is a separate piece attached to the capsule 1, it can be mounted to the capsule as one integral piece. Alternatively it can be applied in fluid or viscous form and then can cure (e.g. polymerize) once applied onto the outer surface of the capsule, which is the case e.g. when applying silicone.

If a resilient material is used for the sealing member 8, preferably rubber-elastic materials are used. The term "rubber-elastic" means any suitable material having rubber elasticity when compressed, including but not limited to elastomers, silicones, plastics, latex, balata or others.

In case the material of the sealing member is the same as the one used for the capsule (e.g. a metal such as aluminum or plastics), preferably the resilient nature of the sealing member is procured by the geometrical shape of the sealing member.

In the embodiment according to FIG. 2 the sealing member 8 is resiliently deflectable due to the lip-shaped form. It is made from the same material as the capsule, preferably plastics. It can be an integral piece of the base body 4 of the capsule 1.

The flexible free lip 8 extends from the outer edge of the flange-like rim 6 and is inclined outwards. In the shown embodiment the flexible lip is the edge of the side walls of the base body of the capsule, which edge is bent by an angle of more than about 90 degrees, preferably comprised between 95 and 175 degrees.

Note that such deflectable sealing member 8 can be placed at any position onto the capsule 1 as long as the position is adapted for an exterior sealing engagement of the sealing member 8 and the enclosing member 9 between the water injector 14 and the perforations in the foil member 5. The sealing member 8 can also be provided on the region of the top wall 17 of the capsule 1 surrounding the water injector 14 when the water injector 14 is in a position protruding into the interior of the capsule 1. The sealing member 8 can also be arranged to cover different portions (bottom, side wall, flange-like rim) of the capsule.

Figure 3:
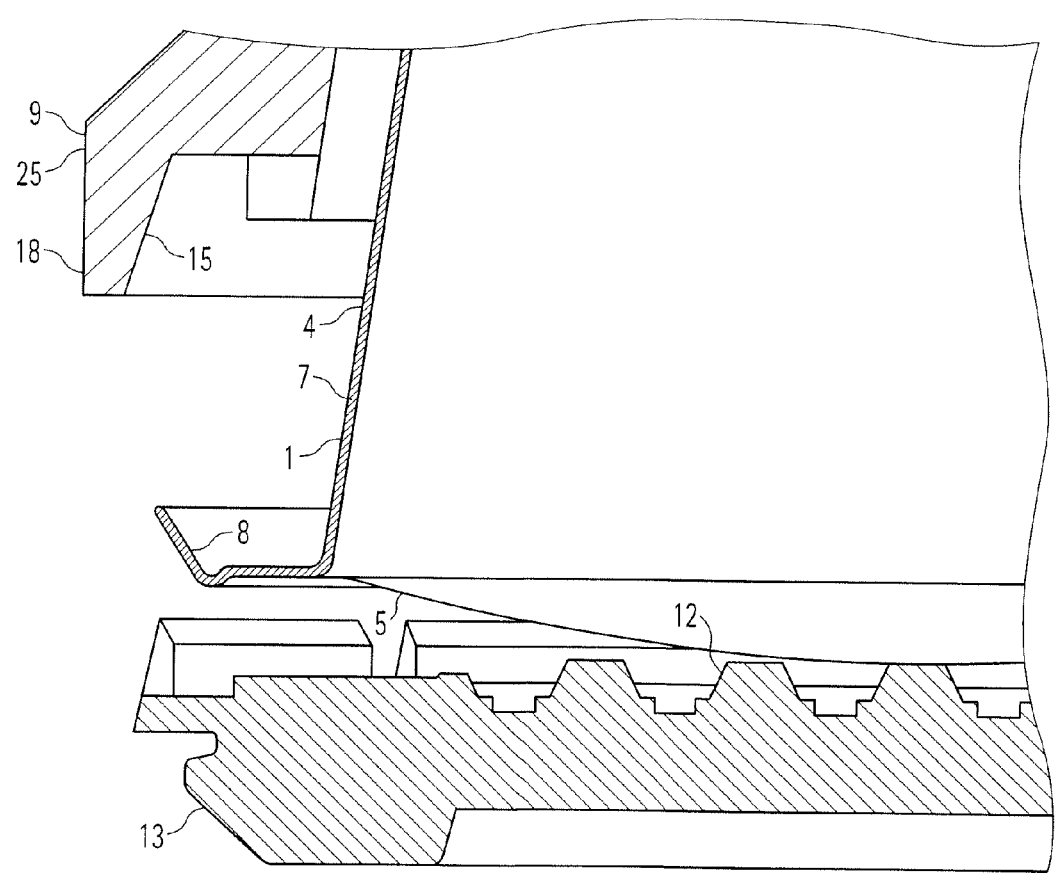
FIG. 3 shows an enlarged in view of FIG. 2

As can be seen in detail in FIG. 3, the bell member 9 according to this embodiment does not comprise any dedicated resilient sealing member. However, the bell member optionally can also comprise additional sealing means.

A divergently inclined sealing surface 15 of the bell member 9 is designed to cooperate with the resiliently deflectable sealing member 8 of the capsule 1. The inclination of the sealing surface is opposite to the inclination of the free flexible lip constituting the sealing member.

Depending on the form and material of the sealing member 8 of the capsule 1, the cooperating surface of the bell member 9 can have any shape, position and orientation which are adapted for a sealing engagement with the sealing member 8 of the capsule 1.

Figure 4:
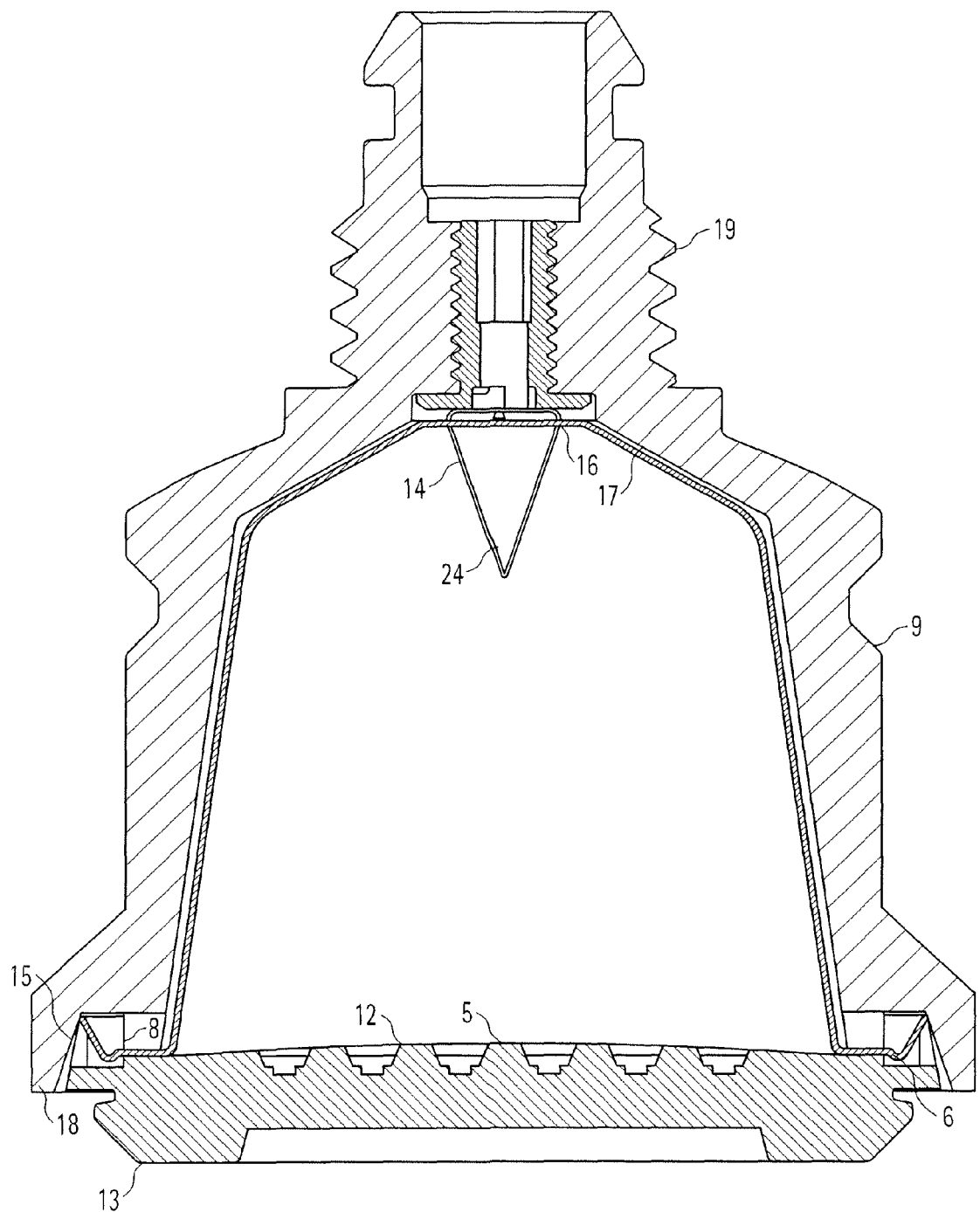
FIG. 4 shows the system of FIG. 2 in a state, in which a capsule has reached its closing position between a bell member and the capsule holder.

FIG. 4 shows the state in which the bell member 9 and the capsule holder 13 are brought in closing pressure engagement and due to the water entering the interior of the capsule and building up a pressure there the pyramidal relief members 12 of the capsule holder 13 have already produced openings in the foil member 5 of the capsule 1. Upon insertion of the capsule the blade element 24 of the water injector 14 creates a perforation 16 in the top wall 17 of the capsule 1. When a sufficient pressure of fluid has been built inside the capsule, the beverage produced from the ingredients contained in the capsule can be drained in small interstices between the relief members 12 and the surrounding foil member 5.

In the state shown in FIG. 4 the resiliently deflectable sealing member 8 of the capsule 1, i.e. the flexible lip, is biased against the corresponding inclined sealing surface 15 of the enclosing member 9. The annular support skirt 18 now covers the end of the flange-like rim 6 of the capsule 1 to ensure that the sealing member 8 and the capsule as such remain in position when the sealing surface 15 of the bell member exerts a certain pressure force of the sealing member 8.

Actually, the lip-shaped sealing member 8 represents an example of a construction for providing a self-reinforcing sealing engagement. Water coming from the water injector will be pressurized within the interstice between the exterior of the capsule and the enclosing member and will eventually arrive at the lip-shaped sealing member. The lip-shaped sealing member will block the water flow as it is biased against the sealing surface of the annular member. This blocking effect will lead to the pressure raising at the upstream-side of the sealing member which in turn will lead to the sealing member being pressed even stronger against the sealing surface and thus to a sealing engagement which is the stronger the higher the pressure at the sealing engagement.

Figure 5:
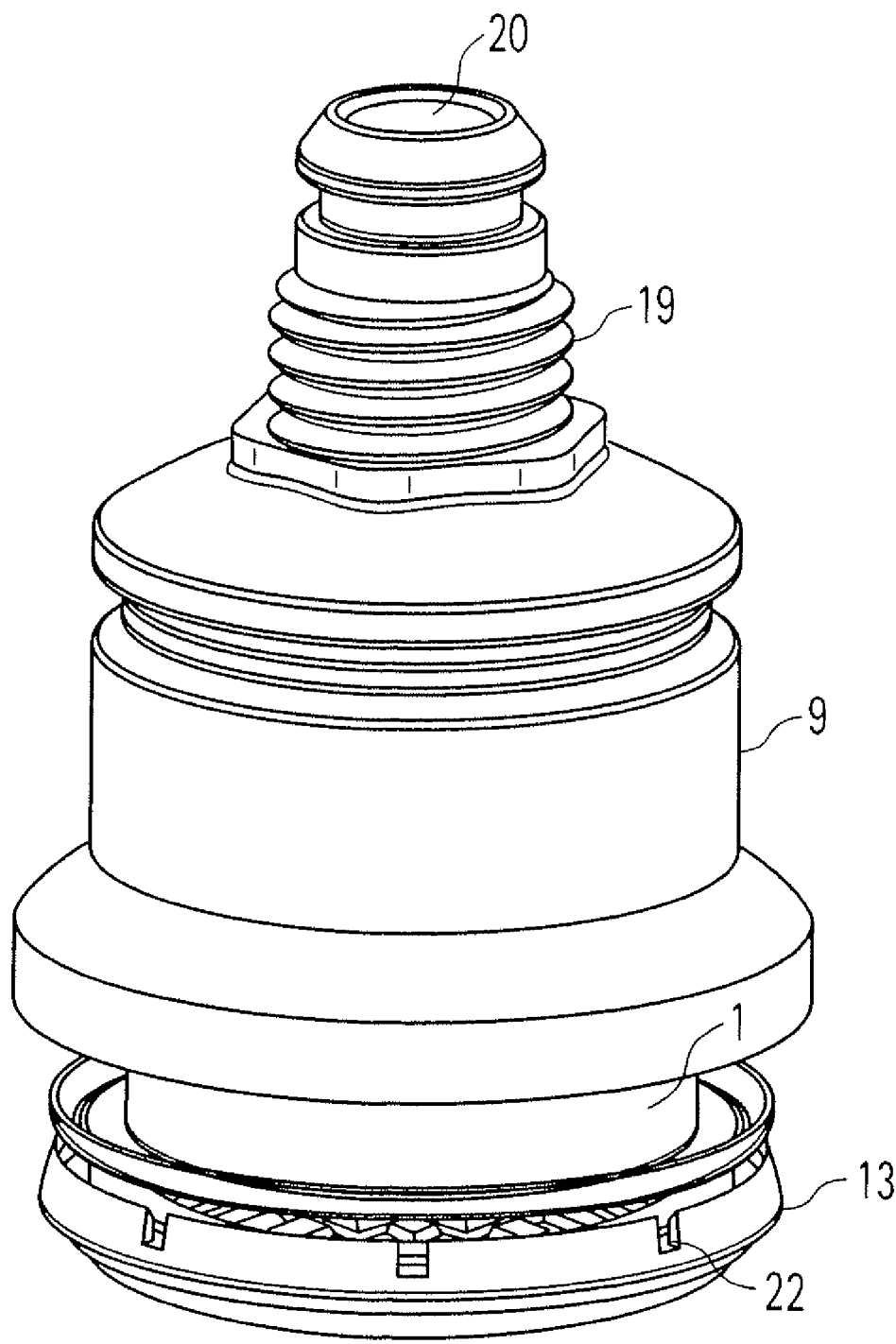
FIG. 5 shows a perspective view of a capsule holder, a bell member and a capsule according to the first embodiment in a position in which the capsule has not yet reached its closing position.

In the embodiment of FIG. 5 grooves 22 are provided in the circumference of capsule holder 13, which grooves 22 act to evacuate water which could settle or accumulate on the upper surface of the capsule holder 13 or dripping out of the capsule before the capsule has been removed.

Figure 6:
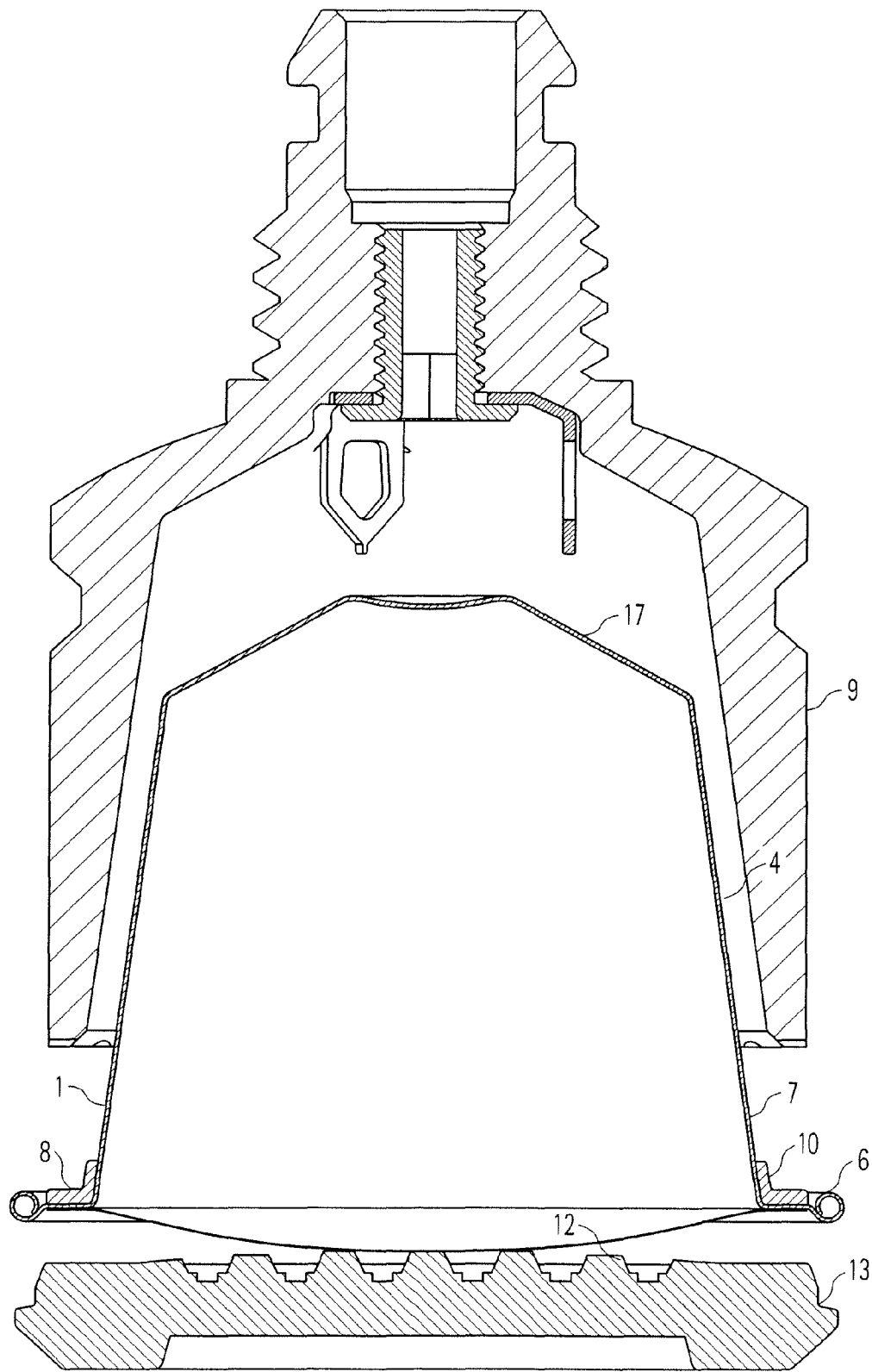
FIG. 6 shows a second embodiment of the present invention.
Figure 7:
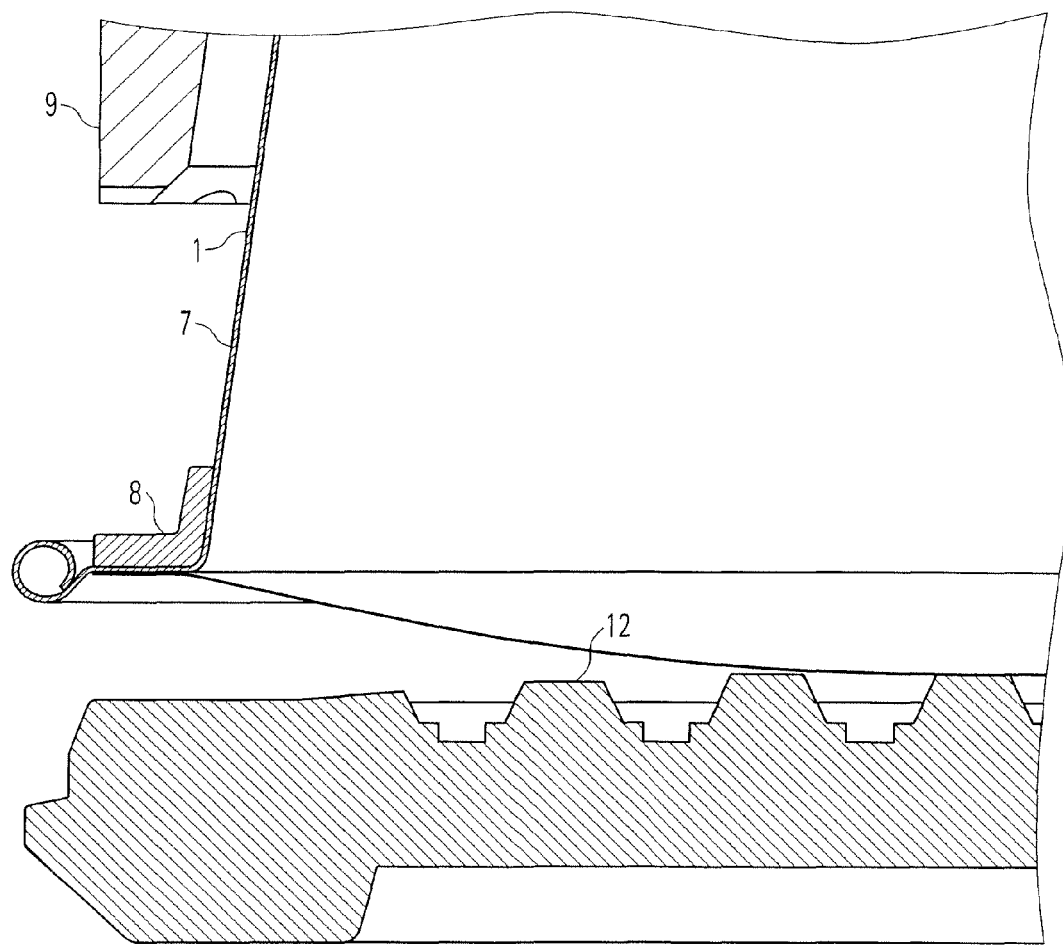
FIG. 7 is an enlarged view of a detail of FIG. 6.

FIG. 6 shows an embodiment essentially corresponding to a variant of the first embodiment of FIG. 2. The sealing member 8 according to this embodiment is compressible. It covers both a portion of the side wall 7 and the area between the outer end of the flange-like rim 6 of the capsule 1 and said side wall 7. (The sealing member can also cover only a portion of the side wall 7 of the base body 4 of the capsule 1.) The sealing member 8 according to this embodiment has a non-symmetrical, i.e. L-shaped cross-section.

Alternatively, the sealing member 8 can have other shapes such as e.g. a film applied to the capsule, an O-ring, etc.

Figure 8:
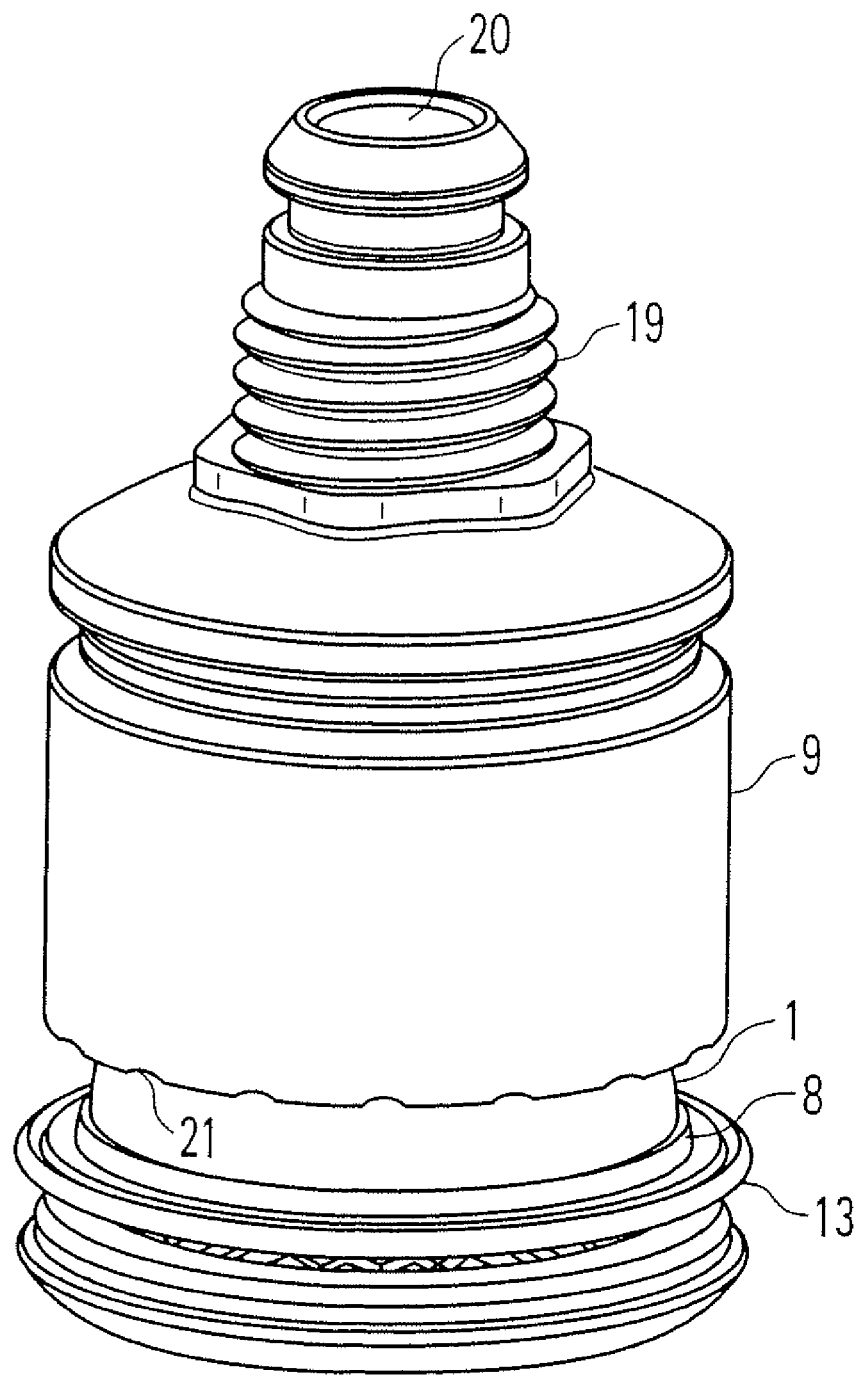
FIG. 8 is a perspective view of the second embodiment.

When the capsule 1 is in a position as shown in FIG. 4 and then, after having finished the beverage production process, the holder 13 is opened, there is a risk that the capsule 1, instead of falling down, remains sucked into the bell member 9 due a "vacuum effect". As shown in FIG. 8 the invention proposes to provide for a mechanism which assures that the type sealing engagement between the capsule 1 and the bell member 9 is only present as long as the bell member 9 is engaged against the capsule holder 13, but automatically released such that air can get into the space between the top wall 17 and the side walls 7 of the capsule 1 and the inner wall of the bell member 9, respectively.

As can be seen from FIG. 8, especially in case the sealing member 8 covers a portion of the side walls 7 of the capsule 1, the annular front surface of the bell member 9 can be uneven, e.g. by providing grooves 21 or other corrugations which, act as air inlet passage for feeding air. The grooves allow the intake of air once the biasing force between the bell member 9 and the capsule holder 13 is released. Air is thus flowing into this space and it will be easier for the user to take out the capsule 1. Eventually, the capsule 1 will even automatically fall down from the bell element 9.

Figure 9:
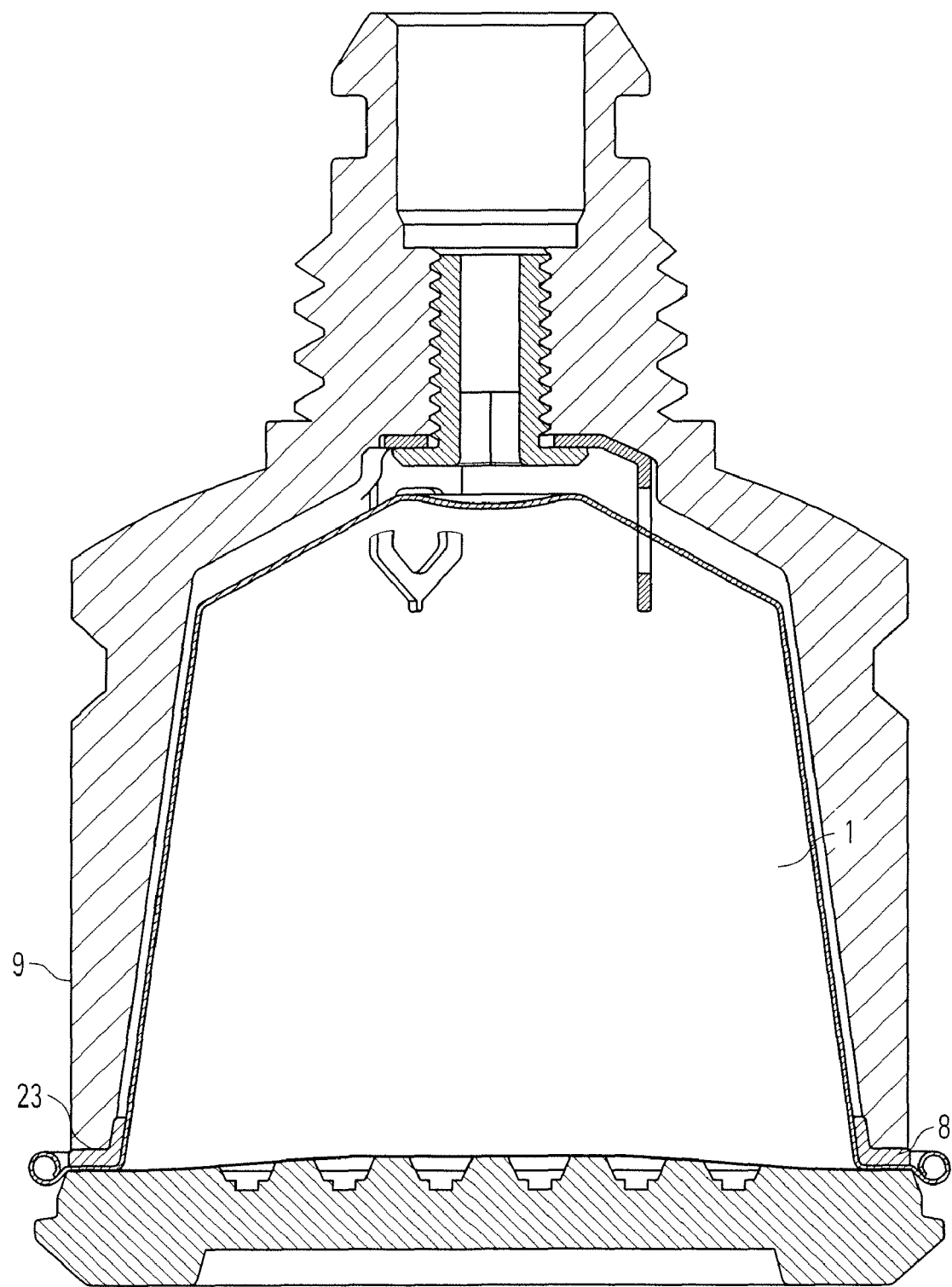
FIG. 9 shows the second embodiment in a state in which the capsule has reached its closing position.

FIG. 9 shows the state of the second embodiment in which the front surface 23 of the bell member 9 is in sealing engagement with the sealing member 8 of the capsule 1.

Figure 10:
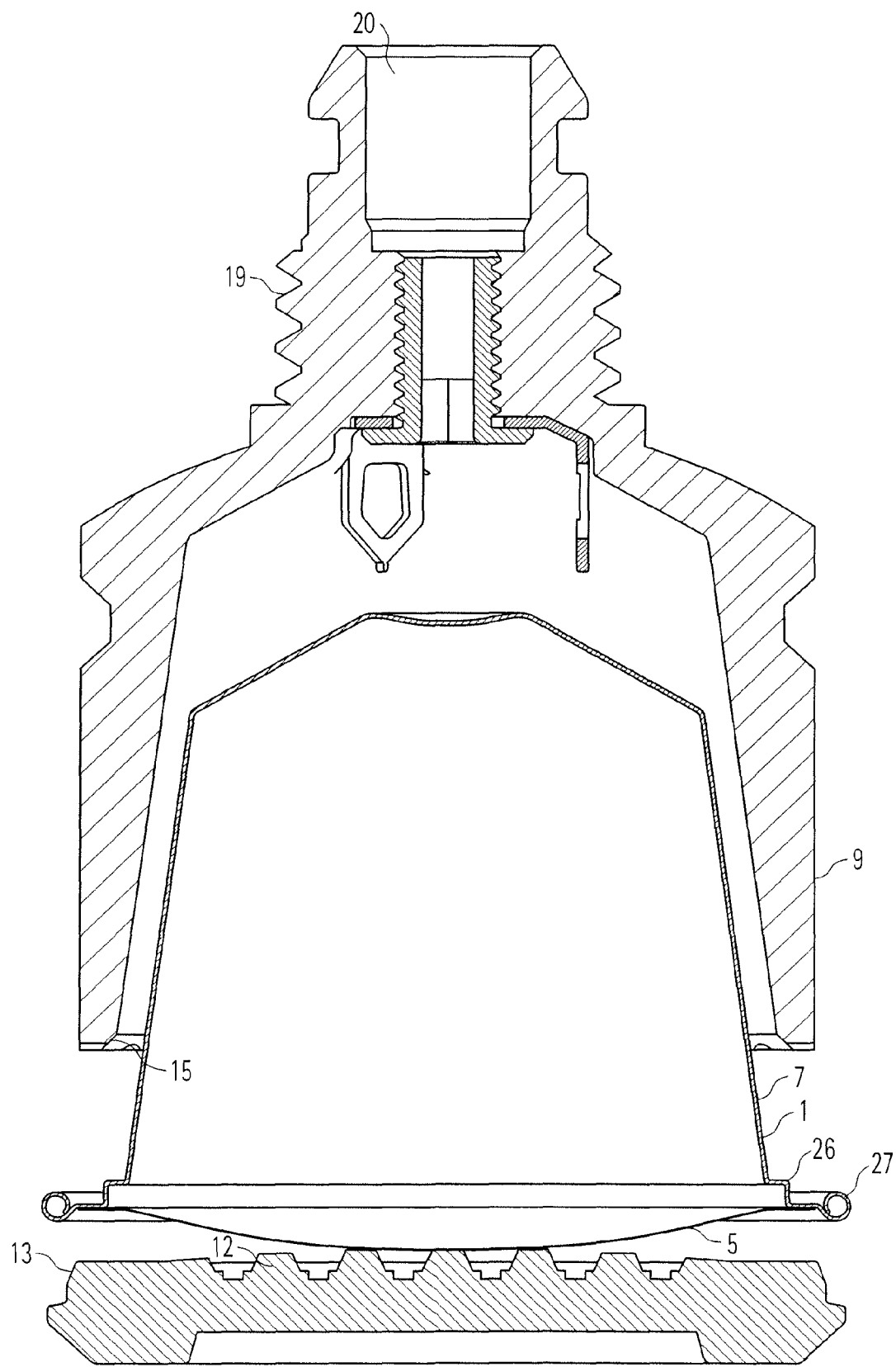
FIG. 10 shows a third embodiment in which the sealing member of the capsule is part of the side wall of the capsule
Figure 11:
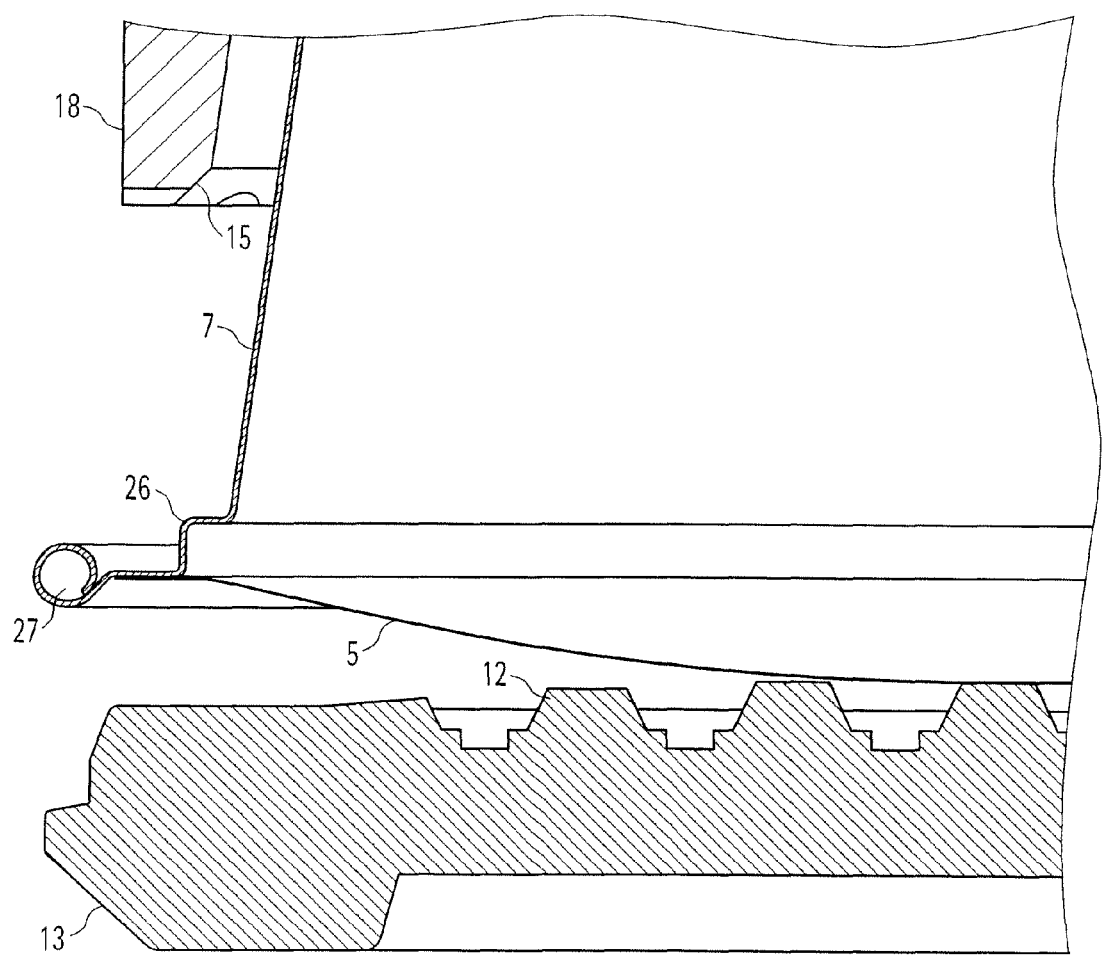
FIG. 11 is a detailed view of FIG. 10.
Figure 12:
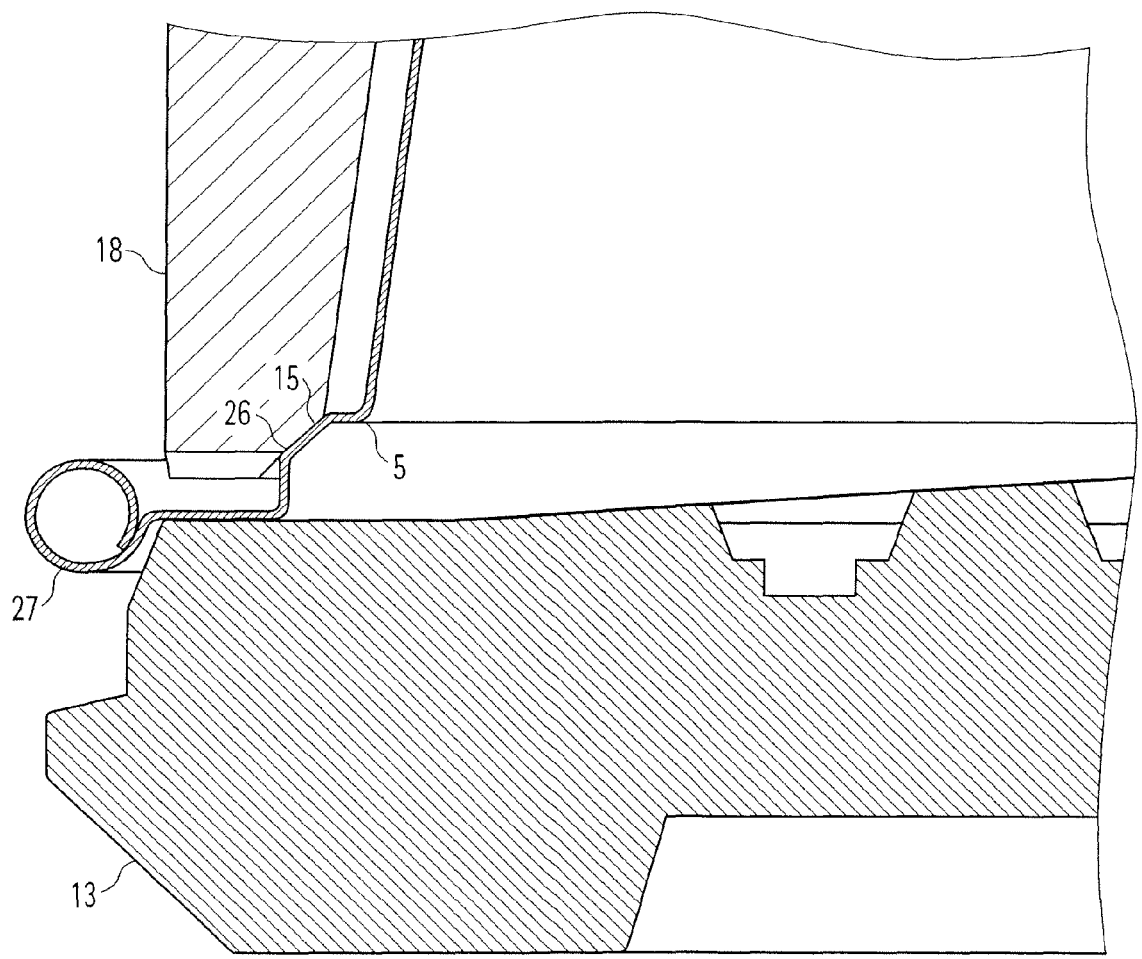
FIG. 12 shows the sealing engagement according to the third embodiment.

FIGS. 10 to 12 show a third embodiment of the present invention in which the resilient nature of the sealing member is due to the geometrical shape of the capsule itself. In the depicted embodiment the sealing member has the shape of a step 26, i.e. a sudden increase of the diameter of the side wall 7 of the capsule 1. Note that the geometrical form is not limited to the shown step and other forms are viable as long as they procure a resilient or at least deformable nature of the sealing member.

The step-like sealing member 26 according to this embodiment is only one example for a hollow sealing member (in contrast e.g. to the "filled" sealing member 8 according to the second embodiment, FIGS. 6 to 9). When the resiliency of the sealing member is procured by the geometrical shape, usually a deflection of the sealing member occurs (here: inwards and downwards deformation of the step). On the other hand, when the resilient nature is due to the material used and a "filled" sealing member is used, usually a compression and/or displacement of the material occur.

The sealing surface 15 according to this embodiment is inclined. Thus the sealing pressure has a first component being directed radially inside and another component being directed axially (downwards in FIG. 12).

As can be seen especially from FIG. 12, the foil member 5 can be wrapped (see reference 27) over the rim of the capsule.

Figure 13:
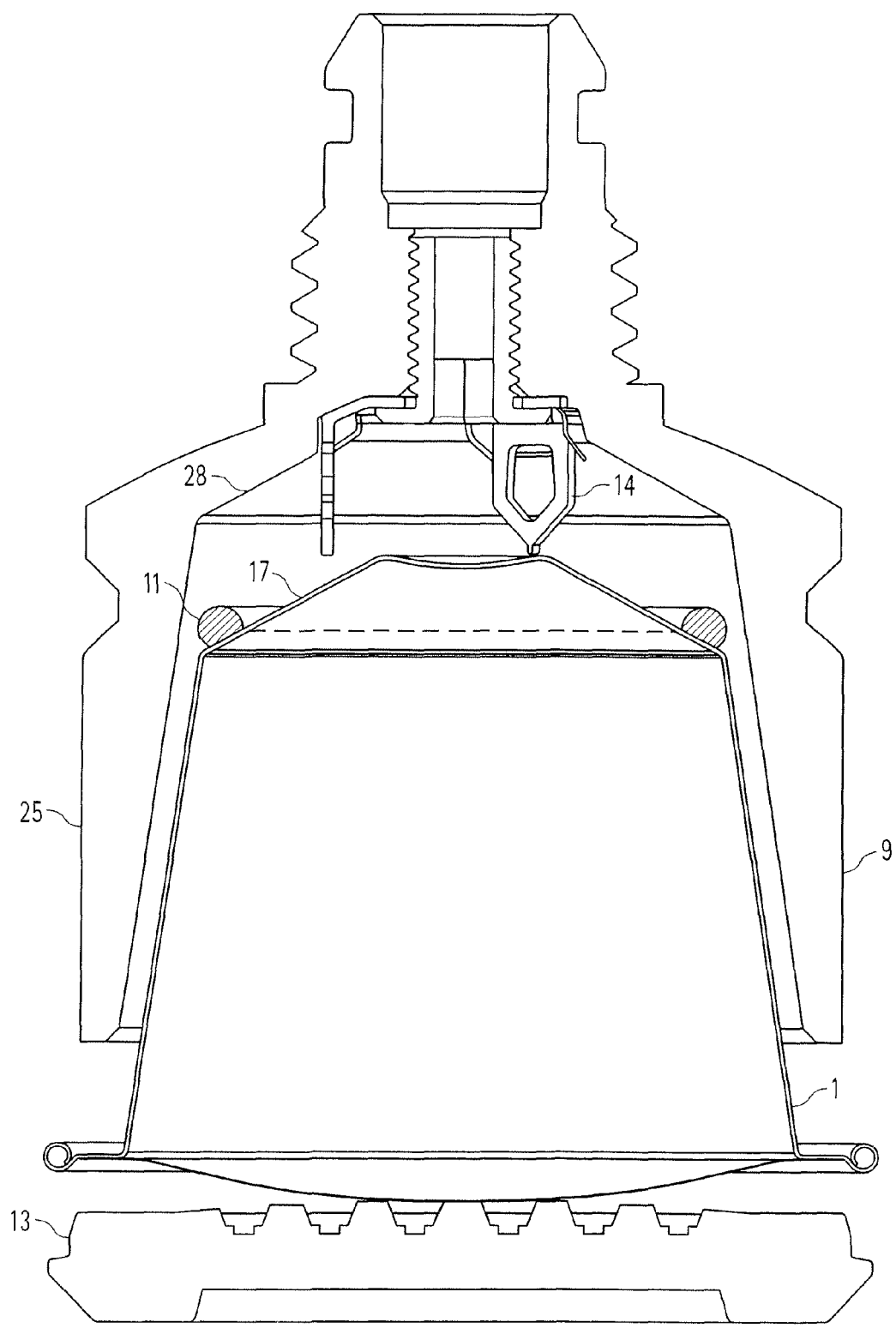
FIG. 13 shows a fourth embodiment in which the sealing member is part of the top wall member of the capsule.
Figure 14:
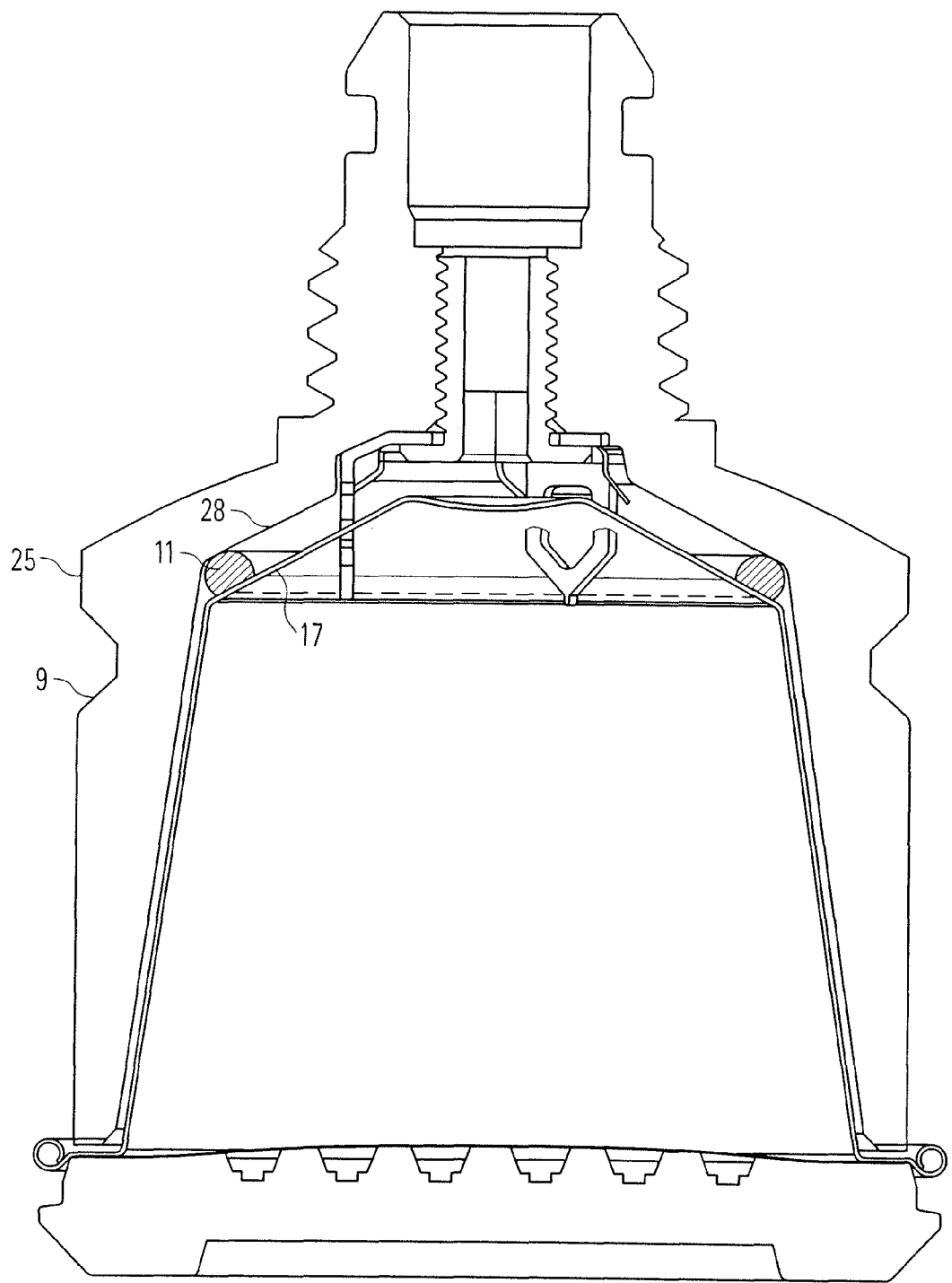
FIG. 14 shows the fourth embodiment in the final state.

FIG. 13 and FIG. 14 show a fourth embodiment in which the sealing member is an O-ring 11. The O-ring is geometrically arranged and, preferably fixed, on the top wall 17 of the capsule 1. This is just an example of providing a sealing member at the exterior of the capsule 1 at the side which faces the water injector and which will be perforated in order to create the water inlets to the capsule 1.

The O-ring 11 is positioned to peripherally surround the area in which the water injector 14 perforates the top wall 17 of the capsule 1. The sealing member 11 is thus compressed by the bottom 28 of the enclosing member 9 and (see FIG. 14) secured in place by the upper end of the circumferential side wall 25 of the enclosing member 9.

Note that the bottom 28 can be substantially flat or inclined to ensure a sufficiently water-tight interface with the sealing member 11 when the capsule is fully engaged in the enclosing member 9 at closing of the device.

As an alternative to the O-ring 11, also a deflectable lip-like sealing member (e.g. comparable to the lip 8 according to the first embodiment, see FIG. 2) can be placed protruding from the top wall 17 of the capsule 1, i.e. the wall facing the water injector 14.

In any case, the bottom 28 will exert an axial compression force on the sealing member 11.

In case e.g. an O-ring is placed on the side wall 7 of the capsule 1, the radial component of the compression force will prevail.

Figure 15:
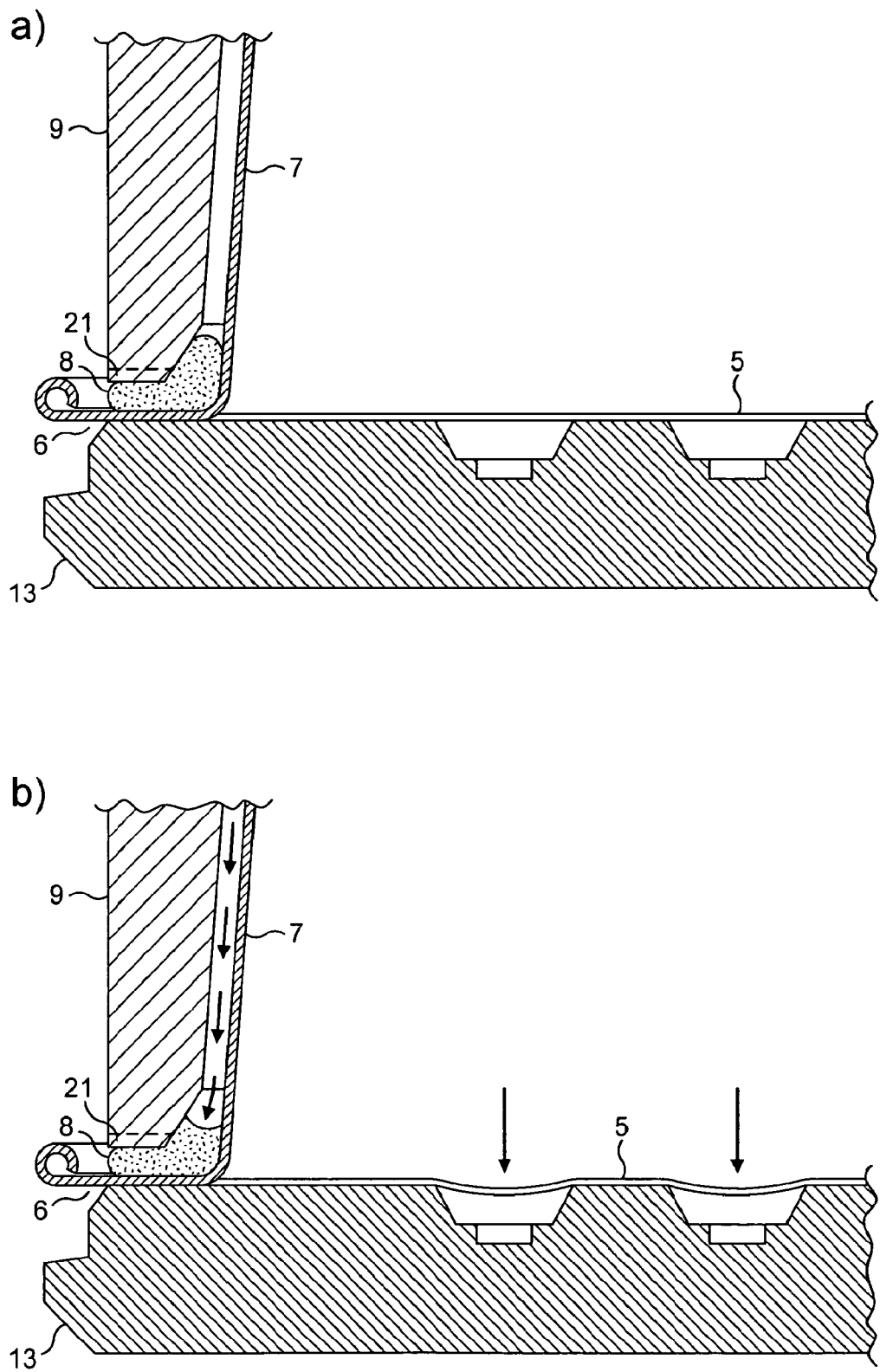
FIG. 15 shows an embodiment is which the sealing material is pressurized by the fluid pressure.
Figure 16:
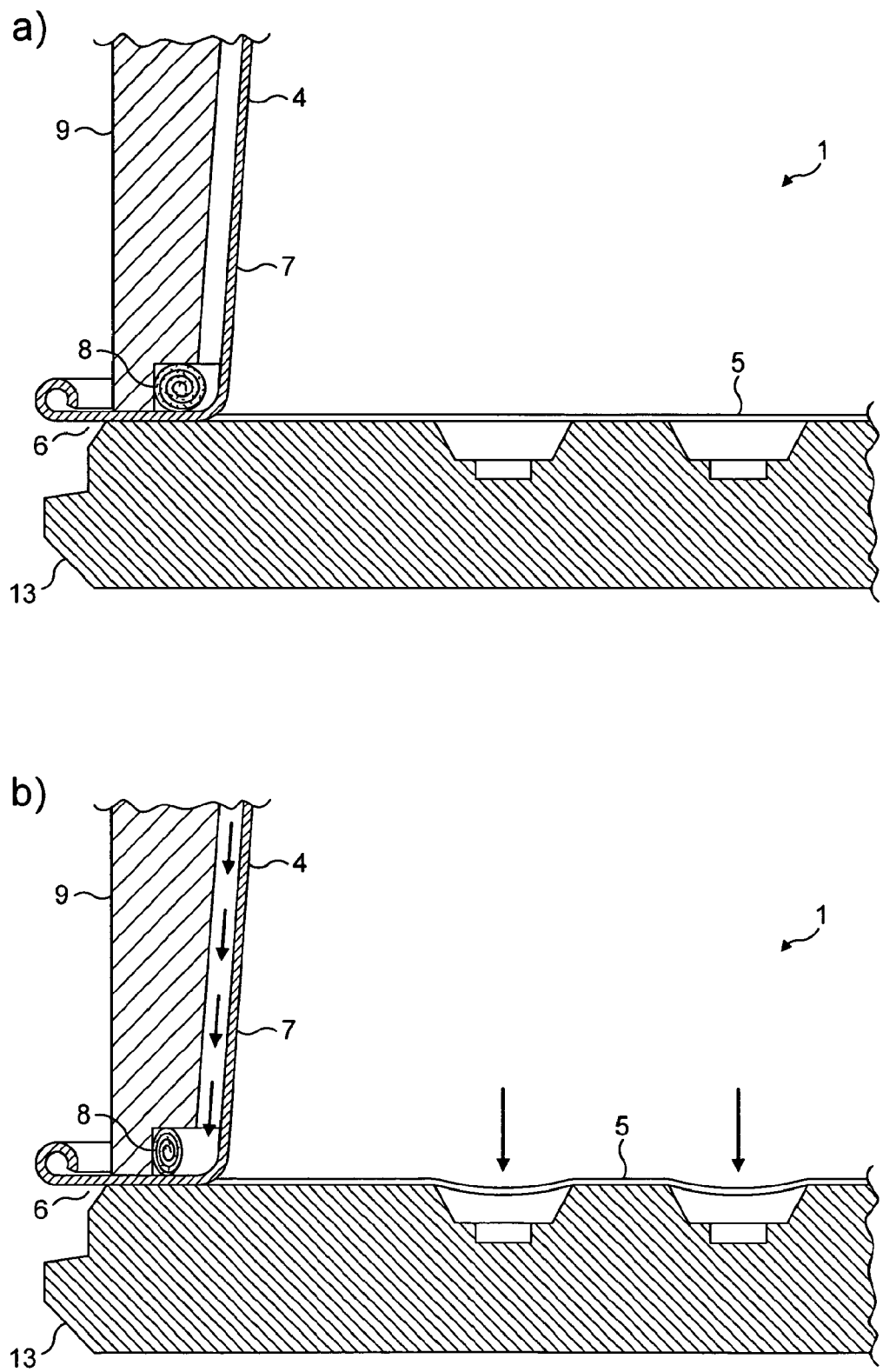
FIG. 16 shows a further embodiment in which the sealing material is pressurized by the fluid pressure in the capsule enclosure space.

With reference to FIGS. 15 and 16 it will now be explained how the water pressure in the capsule enclosure space (defined by the first enclosure member 9 and the second enclosure member 13) can be positively used in order to increase sufficiently the flow resistance between the three participating members, i.e. the two enclosure members 9, 13 and the rim portion of the capsule 1. "Sufficiently" means that 100% tightness is not necessary as long as the pressure inside the capsule is sufficiently high in order to assist to the opening of the outlet face of the capsule.

In FIG. 15 sealing material 8 having no defined initial shape is present at the outer surface of the capsule 1, while in the example of FIG. 16 sealing material is present with defined shape such as e.g. in the shape of an O-ring.

FIGS. 15a and 16a respectively show the status before the water pressure acts on the sealing material 8.

FIGS. 15b and 16b respectively show the status when the water pressure acts on the sealing material 8.

Again, it is assumed that at least in the final approach phase the first and second capsule enclosure member 9, 13 approach each other in a more or less translational trajectory.

At the end of the approach phase, i.e. in the closed position of the first and second enclosing member 9, 13, the outer rim 6 portion of the capsule 1 will be sandwiched between the first and the second enclosing member 9, 13. This sandwiched position of the rim portion of the capsule prevents a delamination of the foil member 5 from the base body 4 of the capsule 1.

In the closed position the sealing material 8 can be at least partially pinched between one of the enclosure members 9, 13 and the rim portion 6 and/or the side walls 7 of the capsule 1.

In any case, there is not necessarily a fluid or pressure-tight engagement between the two enclosure members 9, 13 and the rim portion 6 and the sealing material 8 of the capsule 1. This imperfect sealing engagement can have several reasons. On the one hand, at least one of the enclosure members 9, 13 can be provided with corrugations 21 (s. also FIG. 8 and corresponding description) which are purposely provided in the front phase of the enclosing member 9.

On the other hand, the present invention particularly envisages the use of beverage production machines in which the two enclosing members can be transferred between an open position and a closed position in which the closing force is preset. The closing force of the enclosing member is typically preset in factory and is usually not adjustable by the user. This is in contrast for example to bayonet-like closure members in which the final position of two engaging members is not predefined and essentially depends on the force or torque applied by the user.

Therefore, in the present example of a translational closing trajectory towards a defined closed position, there can be gaps between the two enclosing members 9, 13 due to manufacturing tolerances and/or wear of parts of the beverage production machine.

In any case, without having the sealing material 8, water (s. arrows in FIG. 15b and 16b) penetrating under pressure into the space between the capsule wall and one of the enclosing members 9 would leak from the capsule enclosure space essentially without encountering a major flow resistance. Under these conditions, most likely a pressure inside the capsule sufficient for assisting in a perforation of the foil member 5 would never be achieved or at most would lead to a partial, imperfect opening of the foil member and to quality issue of the beverage released (e.g., coffee with insufficient coffee yield or no crema).

Now, having the sealing material 8 placed on the outer surface of the capsule 1, at the beginning of the water injection under pressure some water might still leak from the capsule enclosure space. However, as the sealing material 8 is at least partially exposed to the water pressure inside the capsule enclosure space, the water pressure will dynamically act on the sealing material 8 such that the sealing material 8 will transit into a pressurized state. In the pressurized state the sealing material 8 will forward the pressure from the water injection both to one of the enclosure members 9, 13 and the portion of the capsule 1 to which the sealing material 8 is attached. Therefore, dynamically and increasingly the sealing material 8 will tend to block any open water flow path. The sealing material 8 will either completely block the water path or at least constitute a flow resistance which is sufficient to cause the pressure inside the capsule raise to a value which is sufficient to assist in the perforation of the foil member 5.

A preferred embodiment provides a wedge-shaped space (FIG. 15) or a step-like portion (FIG. 16) in which at least partially the sealing material 8 is present such that the water pressure will have the tendency to pressurize the sealing material 8 towards a region in which the clearance between the two enclosure member 9, 13 is smaller (or actually zero) in comparison to the location of the sealing material 8 when unpressurized.

The sealing material 8 when used in a configuration as shown in FIGS. 15 and 16 can be made from any (foodgrade) material, such as for example plastics, metal, fibers, paper/vegetable fibers, textile, foam or even a viscous paste or combinations.

The sealing material 8 can be attached to the outer surface of the capsule by gluing, welding or also mechanically (press-fitting, crimping, etc.).

According to the examples shown in FIGS. 15 and 16, the sealing material is preferably dynamically compressed by the fluid pressure. This creates a wedge effect, which in turn creates sufficient pressure loss in the sealing area which enables the increase of the pressure in the enclosing space ("brewing pressure") sufficiently and to obtain the tearing/puncturing of the lower foil (membrane).

The pressure drop created by the sealing material has to be sufficient to enable the pressure in the enclosing space to reach for example 4 bars or more, preferably more than 8 bars, most preferably 10 to 13 bars, at which pressure the foil member will punctured/brake and the coffee extract can be released.

Again, a 100% watertight sealing is not absolutely necessary in the strict sense provided that the pressure in the enclosing space for the capsule can build up to the necessary brewing pressure range.

The surface of the enclosing member should preferably form, together with the capsule surface (rim portion) a wedge-like space such that the sealing member can be form of low dynamically to fill any place and/or gaps.

The sealing member can be pinched during closing in order to be preconstrained to absorb initial plays and/or gaps. However, the main seal effect (pressure loss) is obtained dynamically by the fluid pressure that forces and deforms the seal member against the surfaces of the capsule rim portion and the associated enclosing member.

The sealing material does not necessary have to be resilient, but can also be inelastic, as it is used once only. The preferred dimensions of the sealing material is a thickness of between 0.3 to 2.5 mm, preferably 0.5 to 2 mm, most preferably between 0.75 and 1.25 mm.

The play or gaps can be explicitly provided gaps or holes (s. FIG. 8) provided at the pinching edge of the enclosing members and/or the place due to the changes of tolerances to be compensated (manufacturing tolerances, wearing of the mechanical closing parts, bearings, axes, etc.).

It is proposed that the thickness of the sealing material represents at least twice the dimensions of the explicitly foreseen or to be expected gap or play between the two enclosing members. For example, if the sealing material has a thickness of 0.5 to 2 mm, the maximum allowed gap (in the direction of thickness of the sealing material) can range respectively from about 0.25 to 1 mm.

What is claimed is:

1. A method for producing a beverage from an ingredient-containing capsule, which comprises:

enclosing a sealed capsule into a capsule enclosure space of a beverage production device by a relative displacement of at least two enclosing members which define the capsule enclosure space, wherein the capsule comprises first and second wall members that are sealed at their peripheries to form a flange-like rim and that enclose beverage forming ingredients therein, with the first wall member including an inlet face and the second wall member including an outlet face, and with the enclosing members of the device including a first enclosing member arranged for opening the inlet face of the capsule and injecting a fluid under pressure therein, and a second enclosing member arranged for opening the outlet face of the capsule, opening the inlet face of the capsule with the first enclosing member which injects a fluid under pressure into the capsule in order to eventually open the outlet face of the capsule, the opening of the outlet face of the capsule being assisted by the fluid pressure inside the capsule, wherein the capsule has sealing material on part of the outer surface of the first wall member or extending from a portion of the flange-like rim adjacent the first wall member to form part of the capsule, which sealing material is exposed to the fluid pressure in the capsule enclosure space, and after enclosing the capsule, having the fluid pressure reigning in the capsule enclosure space at least partially act on the sealing material, such that in turn the sealing material is pressed against the first enclosing member thus constituting a flow resistance which prevents the fluid from bypassing the ingredients in the capsule and which is sufficient to guarantee a pressure build-up inside the capsule sufficient for the pressure-assisted opening of the outlet face of the capsule.

2. The method according to claim 1, wherein the fluid pressure acts on the sealing material such that the sealing material is pressed both against the enclosure member and the outer surface of the first wall member of the capsule.

3. A method for producing a beverage from an ingredient-containing capsule, which comprises:

enclosing a sealed capsule into a capsule enclosure space of a beverage production device by a relative displacement of at least two enclosing members which define the capsule enclosure space, wherein the capsule comprises first and second wall members that are sealed at their peripheries to form a flange-like rim and that enclose beverage forming ingredients therein, with the first wall member including an inlet face and the second wall member including an outlet face, opening the inlet face of the capsule and injecting a fluid under pressure into the capsule in order to open the outlet face of the capsule, the opening being assisted by the fluid pressure inside the capsule, wherein the capsule has sealing material on part of the outer surface of the first wall member or extending from a portion of the flange-like rim adjacent the first wall member to form part of the capsule, which sealing material is exposed to the fluid pressure in the capsule enclosure space, and after enclosing the capsule, having the fluid pressure reigning in the capsule enclosure space at least partially act on the sealing material, such that in turn the sealing material is pressed against one of the enclosing members thus constituting a flow resistance which prevents the fluid from bypassing the ingredients in the capsule and which is sufficient to guarantee a pressure build-up inside the capsule sufficient for the pressure-assisted opening of the outlet face of the capsule, wherein the fluid pressure presses the sealing material in a direction towards a clearance between one of the enclosing members and the outer surface of the first wall member of the capsule, wherein the sealing material has a thickness that is greater than that of the clearance.

4. The method according to claim 1, wherein the outlet face of the second wall member of the capsule opens at a pressure of greater than 4 to as much as 8 bars.

5. The method according to claim 1, wherein the two enclosing members at least partially pinch the sealing material and the flange-like rim of the capsule.

6. The method according to claim 1, wherein the displacement of the enclosure members follows an essentially translational trajectory in its final approach phase.

7. The method according to claim 1, wherein the sealing material is at least partially compressed by the enclosing members when closing the capsule enclosure space.

8. The method according to claim 1, wherein the sealing material is compressed by the fluid pressure.

9. The method according to claim 1, wherein the sealing material is selected from the group consisting of fibers, paper, cotton, viscous paste, and foam.

10. The method according to claim 1, wherein the sealing material is made of a material that can be plastically deformed under the pressure of the fluid.

11. The method according to claim 1, wherein the sealing material is attached to the outer face of the capsule by gluing, welding, press-fitting, crimping or combinations thereof.

12. The method according to claim 1, wherein the sealing material has a thickness of 0.3 mm to 2.5 mm.

13. The method according to claim 1, wherein the engaging surface of the enclosing member presents corrugations which are at least substantially closed by the pressurized sealing material.

14. A beverage production system, comprising a capsule enclosure space which can selectively enclose a capsule by a relative displacement of at least two enclosing members including a first enclosing member arranged for opening the inlet face of the capsule and injecting a fluid under pressure therein, and a second enclosing member arranged for opening the outlet face of the capsule, a beverage-ingredient containing capsule comprising first and second wall members that are sealed at their peripheries to form a flange-like rim and that enclose beverage forming ingredients therein, with the first wall member including an inlet face and the second wall member including an outlet face, and a fluid injection member for injecting a fluid under pressure into the capsule, the pressure of the fluid injection assisting in the opening of the outlet face, wherein the capsule has sealing material on part of the outer surface of the first wall member or extending from a portion of the flange-like rim adjacent the first wall member to form part of the capsule, which sealing material is geometrically arranged in order to be exposed to the fluid pressure in the capsule enclosure space, wherein the capsule enclosing members and the capsule are geometrically arranged such that at least said first enclosing member is engaged by the sealing member of the capsule under the effect of the fluid pressure being present between the outer surface of the capsule acting on the sealing member; and wherein the sealing member is pressed against the first enclosing member to form a flow resistance which prevents the fluid from bypassing the ingredients in the capsule and which is effective to enable pressure in the capsule to rise sufficiently until the opening of the outlet face.

15. The system according to claim 14, wherein the sealing member is deformable under the pressure of fluid injection.

16. The system according to claim 14, wherein the sealing member material is different than the material constituting the capsule.

17. The system according to claim 14, wherein the sealing material is selected from the group consisting of fibers, paper, cotton, viscous paste, and foam.

18. The system according to claim 14, wherein the sealing material has a thickness of 0.3 mm to 2.5 mm.

19. The system according to claim 14, wherein the outlet face of the capsule is designed to open at a pressure in excess of the ambient pressure by more than 4 to as much as 8 bars.

20. The system according to claim 14, wherein the engaging surface of the enclosing member presents corrugations which are at least substantially closed by the pressurized sealing material.

21. The system according to claim 14, wherein the two enclosing members are designed to selectively cooperate with the sealing member of the capsule by engaging it with a pinching movement which follows an essentially translational trajectory in its final approach phase.

22. A capsule for containing a beverage ingredient, the capsule comprising first and second wall members that are sealed at their peripheries to form a flange-like rim and that enclose beverage forming ingredients therein, with the first wall member including an inlet face and the second wall member including an outlet face, and a dedicated sealing member on part of the outer surface of the first wall member or extending from a portion of the flange-like rim adjacent the first wall member to form part of the capsule, the sealing member being made from material that is different than the material constituting the wall members of the capsule, wherein, when the capsule is placed in a capsule enclosure space of a beverage producing machine and is selectively enclosed by a relative displacement of at least two enclosing members about the space, wherein a first enclosing member is arranged for opening the inlet face of the capsule and injecting a fluid under pressure therein, and a second enclosing member is arranged for opening the outlet face of the capsule, and further when fluid is injected under pressure into the capsule, the sealing member is pressed against the first enclosing member to form a flow resistance which prevents the fluid from bypassing the ingredients in the capsule and which is effective to enable pressure in the capsule to rise sufficiently until the opening of the outlet face.

23. The capsule of claim 22, wherein the first wall member forms a cup-like base body that includes the beverage forming ingredients therein, the second wall member is a foil member which hermetically seals the ingredients in the capsule, and the sealing material is provided on the rim adjacent the first wall member and is deformable under the pressure of fluid injection.

\* \* \* \* \*